United States Patent [19]

Lewis, Jr.

[11] Patent Number: 4,503,454
[45] Date of Patent: Mar. 5, 1985

[54] COLOR TELEVISION RECEIVER WITH A DIGITAL PROCESSING SYSTEM THAT DEVELOPS DIGITAL DRIVER SIGNALS FOR A PICTURE TUBE

[75] Inventor: Henry G. Lewis, Jr., Hamilton Square, N.J.

[73] Assignee: RCA Corporation, New York, N.Y.

[21] Appl. No.: 444,521

[22] Filed: Nov. 26, 1982

[51] Int. Cl.³ .............................................. H04N 9/32
[52] U.S. Cl. ......................................... 358/13; 358/30
[58] Field of Search .................................... 358/13, 30

[56] References Cited

U.S. PATENT DOCUMENTS

| 4,270,139 | 5/1981 | Flamm et al. | |
|---|---|---|---|
| 4,303,912 | 12/1981 | Stafford et al. | |
| 4,352,123 | 9/1982 | Flamm | |
| 4,355,327 | 10/1982 | Nagumo et al. | 358/13 |

FOREIGN PATENT DOCUMENTS 1369702 10/1974 United Kingdom .

OTHER PUBLICATIONS

Digital Signal Processing for the Marconi Line Array Telecine, R. Matchell, Marconi Communication Systems, Montreux Record, 1983.
U.S. patent application, Ser. No. 405,031, Reduced Data Rate Digital Comb Filter, H. G. Lewis, Jr. & T. V. Bolger, Filed 8/4/82.
The Marconi B3410 Line-Array Telecine, Communications & Broadcasting, Feb. 1982, vol. 7, No. 2, pp. 33–38.
The Marconi B3410 Line Array Telecine, SMPTE Journal, Nov. 1982, pp. 1066–1070.
Digital Video Processing for Telecine, A de M. Fremont, Communications & Broadcasting, vol. 8, No. 2, Feb. 1982, pp. 35–40.

Primary Examiner—Richard Murray
Attorney, Agent, or Firm—Eugene M. Whitacre; Paul J. Rasmussen; Joseph J. Laks

[57] ABSTRACT

In a color television receiver with a digital signal processing system, a chroma processor operates on digital samples containing color picture information to develop first and second binary coded digital signals containing two color mixture signal information such as I color mixture information and Q color mixture information. A luminance processor operates on the digital samples to develop a third digital signal containing Y or luminance information. R, G and B digital signals are related to the developed I, Q and Y digital signals by a set of coefficient multipliers. To obtain the R, G and B digital signals, the I, Q and Y digital signals are applied to a digital decoder that includes a ROM look-up table multiplier for multiplying each of the I, Q and Y signals by the appropriate coefficient multiplier. The products thus generated are summed in an adder to obtain each of the R, G and B signals. A digital-to-analog converter develops analog R, G and B voltages for driving the cathode electrodes of the television receiver color picture tube.

35 Claims, 3 Drawing Figures

COLOR TELEVISION RECEIVER WITH A DIGITAL PROCESSING SYSTEM THAT DEVELOPS DIGITAL DRIVER SIGNALS FOR A PICTURE TUBE

This invention relates to a television receiver with a signal processing system that develops digital color signals.

In digital television receivers, an analog baseband video signal is sampled and the samples converted to representative digital samples by an analog-to-digital converter. The digital samples are processed in a digital comb filter to produce digital signals representing separated luminance and chrominance information. The digital luminance and chrominance information containing signals are then processed in respective channels of a digital signal processor to produce digital color mixture signals such as I and Q signals and digital luminance or Y signals.

Heretofore, to obtain the analog picture tube driver signals, such as R, G and B analog signals, the I, Q and Y digital signals were applied to digital-to-analog converters to produce the counterpart analog I, Q and Y signals. These analog signals were then amplified and matrixed in a resistor matrix to produce the analog R, G and B signals need to drive the cathodes of a color picture tube.

A feature of the invention is a digital signal processing system that digitally processes the color and luminance containing digital signals beyond the I, Q and Y stages, for example, to obtain digital signals representing analog drive signals, such as the R, G and B drive signals. After the digital R, G and B signals are developed, the transition to the analog domain is made by digital-to-analog converters.

Figure 1:
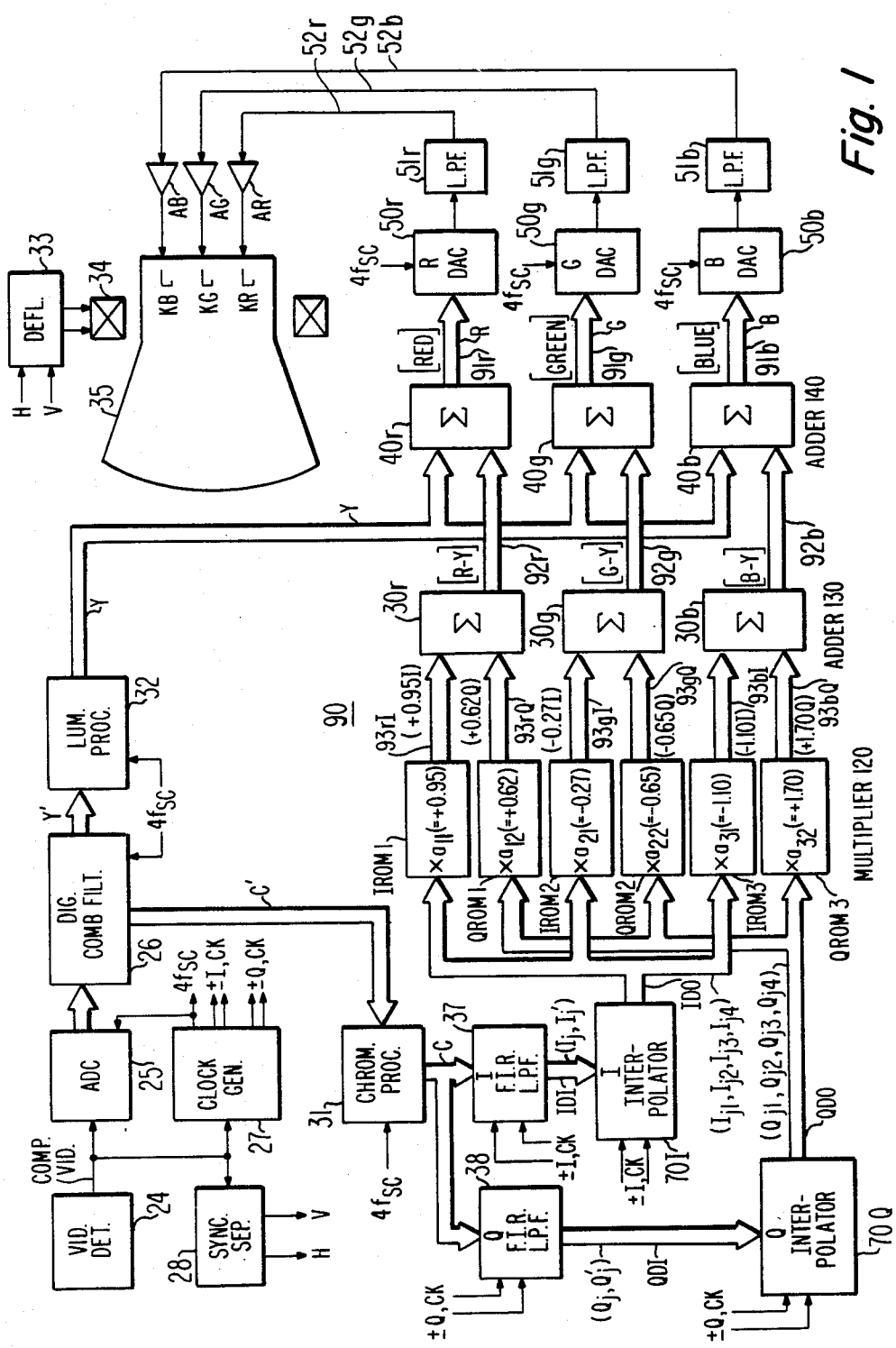
FIG. 1 illustrates a color television receiver digital signal processing system embodying the invention.

In the digital television system illustrated in FIG. 1, a conventional video detector 24 develops an analog composite video signal. The composite video signal is applied to an input of an analog-to-digital converter, ADC 25. ADC 25 samples the video signal at a rate equal to $4f_{sc}$, $f_{sc}$ being the color subcarrier reference frequency, to produce digital samples of the video signal. Each digital sample may comprise, for example, an 8-bit binary coded word in offset two's complement notation. The analog video signal is therefore quantized to one of 256 discrete levels. The $4f_{sc}$ sampling clock signal for ADC 25 is developed by a clock generator 27 to enable the analog-to-digital converter to sample the analog video signal substantially synchronized with the color burst signal contained within the composite video signal.

A sync separator 28 is responsive to the analog video signal provided by video detector 24 and generates horizontal and vertical sync pulses that are applied to a deflection unit 33 along analog signal lines H and V, respectively. Deflection unit 33 develops horizontal and vertical deflection signals for deflection windings 34 of a color picture tube 35.

The digitized video signal samples produced by ADC 25 are applied to an input of a digital comb filter 26 that is clocked by the $4f_{sc}$ clock pulses. Comb filter 26 produces a separated digital luminance signal Y' that is applied to a luminance signal processor 32 that is clocked at the $4f_{sc}$ rate. Luminance processor 32 takes the digitized luminance signal Y' and processes it in accordance with various control signal inputs such as viewer controlled contrast control, not illustrated in FIG. 1, to produce a processed luminance signal Y at a plural bit output data line of the luminance processor.

Comb filter 26 also produces a separated digital chrominance signal C' that is applied to an input of a chrominance processor 31 that is clocked at the $4f_{sc}$ rate. Chrominance processor 31 may include a chrominance amplifier, not illustrated in FIG. 1, that amplifies the chrominance signal in response to viewer controlled color saturation control signals. Processor 32 may also include a chroma digital peaker, not illustrated in FIG. 1, that modifies the response characteristics exhibited by the chrominance signal to compensate for undesirable response characteristics of the intermediate frequency circuitry preceding video detector 24.

The processed digital chrominance signal C that is developed by chrominance processor 31 is then applied to an I finite impulse response low pass filter, FIR 37, and to a Q finite impulse response low pass filter, FIR 38. The I FIR 37 is clocked at a $2f_{sc}$ rate by $\pm$I-clock signals obtained from clock generator 27. Clock generator 27 provides the +I clock signal in synchronism with the occurrence of the +I-axis phase points of the color burst reference signal contained within the composite video signal. Clock generator 27 provides the −I-clock signal in synchronism with the occurrence of the phase points that are 180 degrees out-of-phase with the +I-axis phase points. The Q FIR 38 is clocked at a $2f_{sc}$ rate by $\pm$Q-clock signals obtained from clock generator 27. Clock generator 27 provides the +Q-clock signal in synchronism with the occurrence of the +Q-axis phase points of the color burst reference signal. Clock generator 27 provides the −Q-clock signal in synchronism with the occurrence of the phase points that are 180 degrees out-of-phase with the +Q-axis phase points.

By being clocked at the synchronized $\pm$I and $\pm$Q clock rates, FIR 37 and FIR 38 inherently perform the function of synchronously demodulating the digital chrominance signal C into its digital I, −I, Q, −Q digital signal components while at the same time performing their FIR low pass filtering functions. The I filter 37 has a passband extending from DC to approximately 1.5 megahertz, and the Q filter has a passband extending from DC to approximately 0.5 megahertz. The I and Q filters remove high frequency noise that may be contained in the color signals. An advantage of operating FIR 37 and FIR 38 at twice the $f_{sc}$ rate is the avoidance of significant aliasing and avoidance of signal-to-noise degradation.

In accordance with the invention, the filtered $\pm$I and $\pm$Q digital signals developed at the output of filters 37 and 38 and the Y digital signals developed at the output of luminance processor 32 are converted by a digital decoder 90 into a different set of digital color signals, namely, the R, G and B digital signals developed at data lines 91r, 91g and 91b. The digital R, G and B signals are developed at a $4f_{sc}$ rate in a manner hereinafter to be described even though the I and Q information-containing digital signals are being supplied to digital decoder 90 at only a $2f_{sc}$ rate.

The digital R, G and B signals developed by decoder 90 are applied respectively to digital-to-analog converters DAC 50r,g,b and low pass filtered by respective analog filters 51r,g,b to develop analog R, G, B picture tube drive signals along analog signal line 52r,g,b. The three analog driver signals are amplified respectively by amplifiers AR, AG, and AB before being applied to the cathodes KR, KG, KB of color picture tube 35 to produce a color image from the red, green and blue color images represented by the analog signals on lines 52r, g, b.

As earlier noted, the I and Q data are being supplied to decoder 90 at a $2f_{sc}$ rate since the I and Q filters 37 and 38 are being clocked by clock pulses that occur at the $\pm I$ and $\pm Q$ axes phase points of the color reference signal. To increase the data rate of the I channel in decoder 90 to $4f_{sc}$, an interpolator 70I receives along a data line IDI, at a $2f_{sc}$ rate, the digital samples ($I_j$, $I_j'$) corresponding to the I and $-I$ data. Interpolator 70I processes the samples and produces a data stream of digital words ($I_{j1}$, $I_{j2}$, $I_{j3}$, $I_{j4}$) at a $4f_{sc}$ rate along a data line IDO. Similarly, a Q interpolator 70Q receives the digital samples ($Q_j$, $Q_j'$) corresponding to the Q and $-Q$ data and produces a Q data stream, ($Q_{j1},Q_{j2},Q_{j3},Q_{j4}$), at a $4f_{sc}$ rate along a data line QDO.

Figure 2:
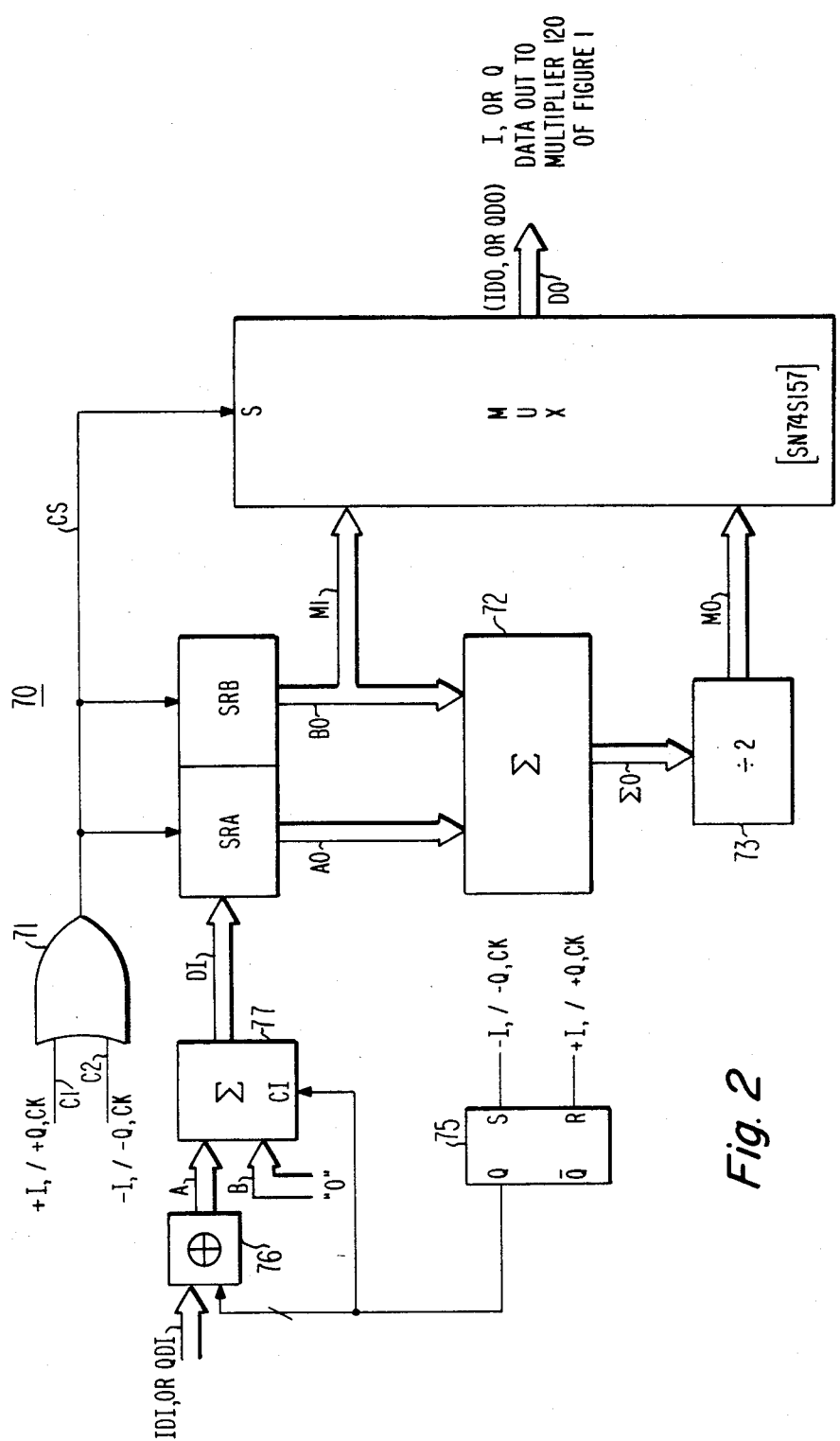
FIG. 2 illustrates an embodiment of the I or Q interpolator of FIG. 1.

FIG. 2 illustrates an interpolator 70 that may be used as either of the interpolators 70I and 70Q of FIG. 1. Interpolator 70 includes a two stage shift register SRA, SRB that is clocked by a signal developed at the output of an OR gate 71, along a clock line CS. The output of shaft register stage SRA along a data line AO and the output of shift register stage SRB along a data line BO are summed in an adder 72. The output of adder 72 along a data line $\Sigma$O is divided by two in a divider stage 73. The output of divider stage 73 along a data line M0 and the output of shift register stage SRB along a data line M1 are applied to a conventionally designed multiplexer 74. Multiplexer 74 outputs a data word along a data line DO that is either the data word developed along line M1, when the state of a select input terminal S of the multiplexer is high, or the data along line M0, if the state of terminal S is low.

Before being further processed in interpolator 70I or 70Q, the output samples of I FIR 37 and Q FIR 38 obtained during the $-I$ and $-Q$ clock intervals, namely the samples $I_j'$ and $Q_j'$ of FIG. 1, are changed in value to their negatives. Otherwise, the demodulated I and Q data obtained during the $-I$ and $-Q$ clock intervals would represent signals 180 degrees out-of-phase with signals being represented by the demodulated I and Q data obtained during the $+I$ and $+Q$ clock intervals.

To change the $I_j'$ or $Q_j'$ sample to its negative, output data line IDI or QDI from FIR 37 or 38 is coupled to an input of an exclusive-or stage, XOR stage 76, of interpolator 70 of FIG. 2. The Q output of set-reset flip-flop 75 is coupled to an input of XOR stage 76 and to a carry-in terminal CI of an adder 77. A digital word having each of its bits equal to a binary zero is applied to an input of adder 77 along a data line B. The output digital word of XOR stage 76 is applied to an input of adder 77 along a data line A.

When the $-I$ or $-Q$ clock pulse is applied to the, set, S input terminal of flip-flop 75, the Q output terminal switches to a logical "1" that is then applied to XOR stage 76 and to the CI terminal of adder 77. The $I_j'$ or $Q_j'$ digital word is one's complemented in XOR stage 76 and incremented by one at its least significant bit location in adder 77 to produce the two's complement of the $I_j'$ or $Q_j'$ digital word at the output of adder 77 along data line DI. The two's complemented digital word is the negative of the original digital word $I_j'$ or $Q_j'$.

When the $+I$ or $+Q$ clock pulse is applied to the reset, R input terminal of flip-flop 75, the Q output terminal switches to a logical "0". The $I_j$ or $Q_j$ digital word is then passed along from data line IDI or data line QDI to data line DI, unaltered by XOR stage 76 and adder 77. Thus at the output of adder 77 there is developed an I data stream ($I_j$, $-I_j'$) or Q data stream ($Q_j$, $-Q_j'$).

The remaining operation of interpolator 76 of FIG. 2 will now be described assuming that interpolator 70 is used as I interpolator 70I of FIG. 1. The I data stream ($I_j$, $-I_j'$) developed at data line DI of FIG. 2 is applied to shift register stage SRA. The $+I$ clock pulse is applied to an input signal line C1 of OR gate 71 and the $-I$ clock pulse is applied to an input signal line C2. Note, that when interpolator 70 is used as the Q interpolator 70Q, the $+Q$ clock pulse is applied to line C1 and the $-Q$ clock plse is applied to line C2.

Figure 3:
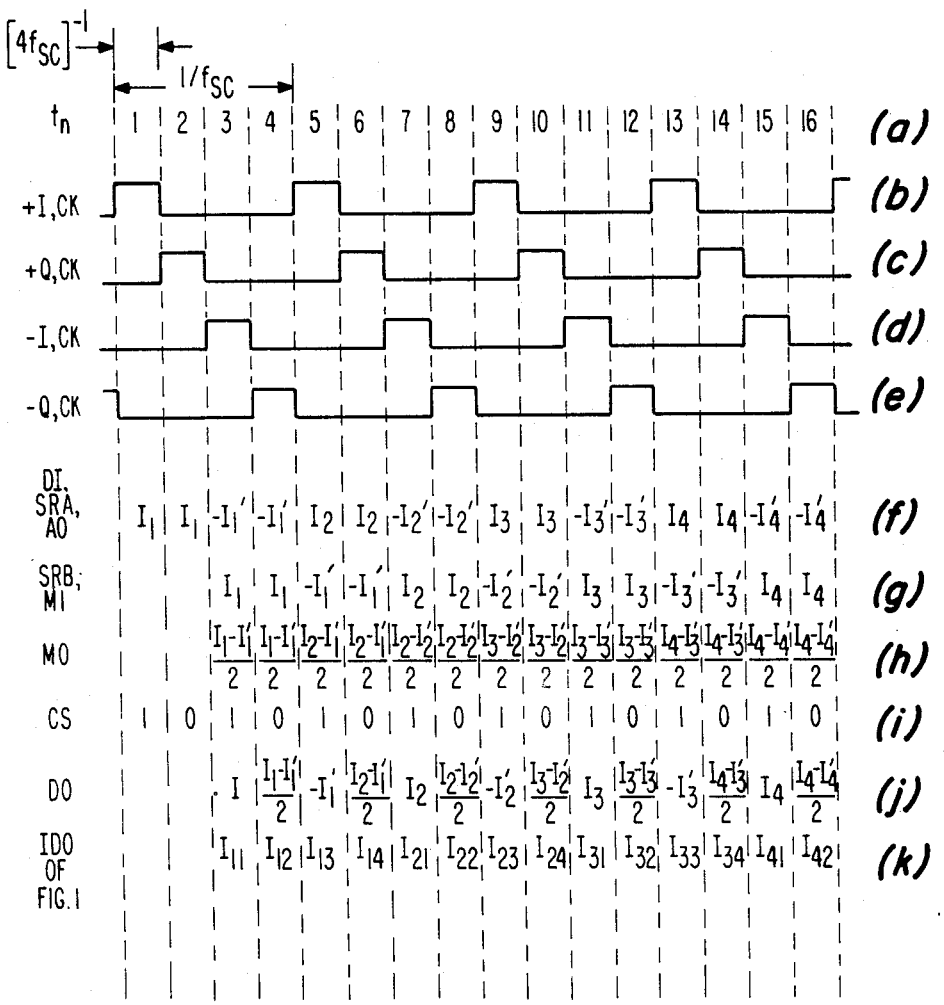
FIG. 3 illustrates a combined timing diagram and table useful in explaining operation of the interpolator of FIG. 2.

As illustrated in the combined timing diagram and data table of FIGS. 3a–3k, the $+I$ clock pulses of FIG. 3b, obtained from clock generator 27, occur during the intervals $t_n=t_1, t_5, t_9, t_{13}, \ldots$, where an interval $t_n$ is of duration $1/(4f_{sc})$. The $-I$ clock pulses occur 180 degrees out-of-phase with the $+I$ clock pulses and occur during the intervals $t_n=t_3, t_7, t_{11}, t_{15}, \ldots$. For completeness sake, the timing diagram portion of FIG. 3 illustrates the $+Q$ clock pulses occurring during the intervals $t_n=t_2, t_6, t_{10}, t_{14}, \ldots$ and the $-Q$ clock pulses occurring during the intervals $t_n=t_4, t_8, t_{12}, t_{16}, \ldots$.

Assume, as illustrated in FIG. 3f, that in interval $t_1$, the data sample $I_1$ is clocked into shift register stage SRA along data line DI. In interval $t_2$, neither the $+I$ clock nor the $-I$ clock pulse are present and the state of clock line CS is low, as illustrated in FIG. 3j. The $I_1$ data sample therefore remains in shift register stage SRA during the interval $t_2$. In the next interval, $t_3$, the $-I$ clock pulse arrives at input line C2 to switch clock line CS high. The previous data in shift register stage SRA is shifted to stage SRB and the new data sample the $-I_1'$ data sample is stored in SRA. Thus SRA stores the $-I_1'$ data sample and SRB stores the $I_1$ data sample in the interval $t_3$.

In the interval $t_3$, data samples $I_1$ and $-I_1'$ are summed in adder 72 and then the average value of the sum is taken by operation of divide-by-two divider 73 to produce at multiplexer input data line M0 the digital word representing the interpolated value of the I data between the two samples $I_1$ and $-I_1'$. As indicated in FIG. 3h, in the interval $t_3$, the interpolated I data at data line $M0=(I_1-I_1')/2$. In the interval $t_3$, therefore, the digital sample $I_1$ is at multiplexer input data line M1 and the interpolated I digital word equaling the average value of $I_1$ and $-I_1'$ is at multiplexer input data line M0.

Because clock signal line CS is high in the interval $t_3$, the output digital word at multiplexer output data line DO is selected to be the digital word being developed at input data line M1. As illustrated in FIG. 3j, the digital sample $I_1$ is developed at data line DO during the interval $t_3$. This word is the same as the digital word $I_{11}$ at the I interpolator 70I output data line IDO of FIG. 1 for $j=1$. $I_{11}$ is also noted in FIG. 3k in the interval $t_3$.

Continuing the above-described process for subsequent intervals $t_n=t_4, t_5, t_6, \ldots$, one observes from an inspection of FIGS. 3f, j and k that a data stream ($I_j$, $-I_j'$) entering interpolator 70I along input data line DI at a $2f_{sc}$ rate exits the interpolator along output data line IDO at a $4f_{sc}$ rate as an I data stream ($I_{j1}$, $I_{j2}$, $I_{j3}$, $I_{j4}$). Data samples $I_{j1}$ and $I_{j3}$ correspond to the actually sampled I data samples $I_j$ and $-I_j'$, whereas data samples $I_{j2}$ and $I_{j4}$ are digital words alternately inserted or interposed between actual I data samples, representing the interpolated average value of two adjacent actual I data samples. Interpolation improves the signal-to-noise characteristic of the I and Q data streams by averaging the noise components imbedded in the data stream.

In the manner just described, an I data stream or a Q data stream is generated at a $4f_{sc}$ rate, a rate faster than the $2f_{sc}$ rate that the I finite impulse response filter 37 or the Q finite impulse response filter 38 is being clocked. An advantage of using a faster rate data stream is that ultimately when the digital data is converted to the analog domain, simpler analog low pass filters may be used to remove sampling frequency components.

Reference is now made to the operation of the remaining portion of digital decoder 90 of FIG. 1 once the $4f_{sc}$ rate I and Q data streams are developed at the outputs of interpolators 70I and 70Q. Although not indicated in FIG. 1, stages 120, 130 and 140 of decoder 90 are each clocked at the $4f_{sc}$ rate. The color information contained in the I and Q data streams are converted from the I—Q color mixture coordinates to the R—Y, B—Y color difference coordinates. The set of I, Q digital signals ($E_I$, $E_Q$) are related to the set of R—Y, B—Y, G—Y digital signals ($E_{R-Y}$, $E_{B-Y}$, $E_{G-Y}$) by a set of coefficient multipliers ($a_{pq}$) where p=1,2 and q=1,2,3, in accordance with the well-known equations:

$$E_{R-Y}=a_{11}E_I+a_{12}E_Q$$

$$E_{G-Y}=a_{21}E_I+a_{22}E_Q$$

$$E_{B-Y}=a_{31}E_I+a_{32}E_Q$$

where $a_{11}=+0.95$; $a_{12}=+0.62$; $a_{21}=-0.27$; $a_{22}=-0.65$; $a_{31}=-1.10$; $a_{32}=+1.70$.

To achieve the conversion of the digital data from the I, Q color mixture coordinates to the R—Y, B—Y color difference coordinates, the I data stream developed along data line IDO is applied to I data coefficient multipliers IROM1-IROM3 of a multiplier stage 120. Each of the I data multipliers IROM1-IROM3 multiplies an I data digital word by the appropriate one of the coefficients $a_{11}$, $a_{21}$, $a_{31}$. Each of the Q data multipliers QROM1-QROM3 multiplies a Q digital word by the appropriate one of the coefficients $a_{12}$, $a_{22}$, $a_{32}$.

The product data produced by multiplier IROM1 at output data line 93rI is summed in an adder 30r of an adder stage 130 with the product data produced by multiplier QROM1 at output data line 93rQ. The output of adder 30r at output data line 92r is the R—Y color difference digital signal. The product data produced by IROM2 and QROM2 are summed in an adder 30g to produce the G—Y color difference digital signal along data line 92g. The product data produced by IROM3 and QROM3 are summed in an adder 30b to produce the B—Y color difference signal along output data line 92b.

To develop the R digital signal at output data line 91r of digital decoder 90, the R—Y digital signal obtained from adder 30r and the luminance digital signal Y obtained from luminance processor 32 are summed in an adder 40r of an adder stage 140. To develop the G digital signal at data line 91g, the G—Y digital signal from adder 30g is summed with the Y luminance digital signal in an adder 40g. To develop the B digital signal at data line 91b, the B—Y color difference digital signal from adder 30b is summed with the Y luminance digital signal in an adder 40b. The analog R, G, B drive signals are then obtained by digital-to-analog conversion into DAC 50r, g, b and lowpass filtering by analog filters 51r, g, b.

Using the multiplier arrangement of digital decoder 90 embodying the invention to obtain the R, G, B information in digital form has the advantage that the non-identical gains of I and Q FIR filters 37 and 38 may be compensated for by modifying the set of coefficients ($a_{pq}$) to take this factor into account.

Each of coefficient multipliers IROM1-IROM3 and QROM1-QROM3 may be a read only memory unit (ROM) arranged as a multiplier look-up table. The digital word applied to the ROM along the IDO or QDO data line has associated with it a corresponding address of a memory location in the ROM. In this memory location is stored the product of the appropriate coefficient multiplier and the value of digital word being applied to the ROM. The output of the ROM is the digital word representing the stored product data.

An advantage of using a ROM as a multiplier is that the coefficient related products stored in the ROM may take into account that the phosphor emission characteristics of the color picture tube are not the ideal NTSC related characteristic coefficients recited above for the coefficient multiplier set ($a_{pq}$). When using non-ideal phosphors, the stored products in the ROM may be calculated based on a modified set of coefficient multipliers suitable for use with the actual phosphors chosen for the color picture tube.

If a programmable ROM were to be used, then different product data may be written into the ROM when different types of picture tubes are employed for different television receivers or when different gains of the I and Q channels are desired.

What is claimed is:

1. In a color television display apparatus, a digital signal processing system for developing from a digitally supplied information signal a plurality of analog drive signals for an image display device, said system comprising:

means for providing binary coded digital samples containing color picture information;

a digital processor operating on said digital samples for developing a first set of a plurality of binary coded digital signals containing color and luminance information derived from said color picture information;

a digital-to-analog converter arrangement responsive to a second set of a plurality of binary coded digital signals for developing therefrom said plurality of analog drive signals to produce an image display, each of the digital signals of the second set being related to the digital signals of the first set by a set of coefficient multipliers that produce an image display containing said color picture information; and a plurality of memory units being supplied with said first set of digital signals, each arranged as a look-up table multiplier for multiplying the binary coded digital signals of said first set by the appropriate multipliers of said set of coefficient multipliers; and means for summing the products generated by said plurality of memory units to develop said second set of digital signals from said first set of digital signals.

2. A system according to claim 1 wherein said plurality of binary coded digital signals of said first set comprise first, second and third digital signals respectively containing color information along first and second color axes of a color reference signal and luminance information, and wherein said plurality of binary coded digital signals of said second set comprise first, second and third digital signals respectively containing first, second and third primary color information.

3. A system according to claim 2 wherein said digital processor includes a luminance processor for developing the luminance information-containing third digital signals, generated at a first rate and a chrominance processor for developing the color mixture information-containing first and second digital signals, generated at a second rate lower than the first rate.

4. A system according to claim 3 including means responsive to said first and second digital signals of said first set for generating digital words interposed between samples of the first and second digital signals of said first set to increase the rate at which samples of said first and second digital signals of said first set are being supplied to said plurality of memory units.

5. A system according to claim 4 wherein the rate at which samples of said first and second digital signals of said first set are being supplied to said plurality of memory units is increased to the rate at which samples of the luminance information-containing third digital signals are being supplied.

6. A system according to claim 4 wherein said second rate is a submultiple of said first rate.

7. A system according to claim 6 wherein said first rate equals four times the frequency of said color reference signal and said second rate equals two times the frequency of said color reference signal.

8. A system according to claim 7 wherein said digital processor includes a chrominance processor for developing a chrominance information-containing binary coded digital signal and first and second finite impulse response lowpass filters to which said chrominance information-containing signal is applied, said first filter being clocked by a first clock signal having a frequency of twice the color reference signal frequency and having clock pulses that are in-phase and 180 degrees out-of-phase with the occurrence of the first color axis phase points of said color reference signal, said second filter being clocked by a second clock signal having a frequency of twice the color reference signal frequency and having clock pulses in-phase and 180 degrees out-of-phase with the occurrence of the second color axis phase points of said color reference signal.

9. A system according to claim 1 wherein said digital processor includes means for developing a chrominance information-containing binary coded digital signal and first means responsive to said chrominance information-containing signal and being clocked by a clock signal generator that generates first clock pulses when the phase points of a first color axis of a color reference signal occur and also when the phase points occur that are 180 degrees out-of-phase with the phase points of the first color axis for developing a first one of said plurality of binary coded digital signals of said first set that contains first color information, said first one digital signal being developed at the rate of said first clock pulses.

10. A system according to claim 9 including means for developing first interpolated digital words representing interpolated values of said first one digital signal, said first interpolated digital words being developed at instants interposed between instants when said first clock pulses are generated to permit said plurality of memory units to be supplied with samples of said first one digital signal at a rate faster than the rate of said first clock pulses.

11. A system according to claim 10 wherein said digital processor includes second means responsive to said chrominance information-containing signal and being clocked by said clock signal generator with second clock pulses that occur when the phase points of a second color axis occur and that also occur when the phase points occur that are 180 degrees out-of-phase with the phase points of the second color axis for developing a second one of said plurality of binary coded digital signals of said first set that contains second color information, said second one digital signal being developed at the rate of said second clock pulses, and including means for developing second interpolated digital words representing interpolated values of said second one digital signal, said second digital words being developed upon the occurrence of the phase points of said first color axis to permit said plurality of memory units to be supplied with samples of said second one digital signal at a rate faster than the rate of said second clock pulses and wherein said first interpolated digital words are developed upon the occurrence of the phase points of said second color axis.

12. A system according to claim 11 wherein said digital processor includes means for developing a third one of said plurality of binary coded digital signals of said first set containing luminance information, said first, second and third ones of said plurality of binary coded digital signals of said first set each being supplied to said plurality of memory units at the same rate.

13. A system according to claim 12 wherein the aforementioned same rate equals four times the frequency of said color reference signal.

14. A system according to claim 1 wherein said digital processor includes means for developing a chrominance information-containing binary coded digital signal and first means responsive to said chrominance information-containing signal and clocked by first clock pulses that occur when the phase points of a first color axis of a color reference signal occur for developing a first one of said plurality of binary coded digital signals of said first set that contains first color information, and means for developing first interpolated digital words representing interpolated values of said first one digital signal, said first interpolated digital words being developed at instants interposed between instants when said first clock pulses are generated to permit said plurality of memory units to be supplied with samples of said first one digital signal at a rate faster than the rate of said first clock pulses.

15. A system according to claim 14 wherein said digital processor includes second means responsive to said chrominance information-containing signal and being clocked by second clock pulses that occur when the phase points of a second color axis occur for developing a second one of said plurality of binary coded digital signals of said first set that contains second color information, and means for developing second interpolated digital words representing interpolated values of said second one digital signal to permit said plurality of memory units to be supplied with samples of said second one digital signal at a rate faster than the rate of said second clock pulses.

16. A system according to claim 15 wherein said digital processor includes means for developing a third one of said plurality of binary coded digital signals of said first set containing luminance information, said first, second and third ones of said plurality of binary coded digital signals of said first set each being supplied to said plurality of memory units.

17. A system according to claim 1 wherein said digital processor includes means for developing a chrominance information-containing binary coded digital signal and a first finite impulse response filter receiving said chrominance information-containing signal and being clocked by clock pulses that occur when the phase points of a first color axis of a color reference signal occur and also when the phase points occur that are 180 degrees out-of-phase with the phase points of the first color axis for developing a first one of said plurality of binary coded digital signals of said first set, said first one digital signal containing first color information.

18. A system according to claim 17 including means for developing digital words representing interpolated values of said first one digital signal at the phase points of a second color axis of said color reference signal to permit said plurality of memory units to be supplied with samples of said first one digital signal at a rate faster than the rate at which said finite impulse response filter is being clocked.

19. A system according to claim 18 wherein said digital processor includes a second finite impulse response filter receiving said chrominance information-containing signal and being clocked by clock pulses that occur when the phase points of a second color axis of said color reference signal occur and when the phase points occur that are 180 degrees out-of-phase with the phase points of the second color axis for developing a second one of said plurality of binary coded digital signals of said first set, said second one digital signal containing second color information, and including means for developing digital words representing interpolated values of said second one digital signal at the phase points of said first color axis to permit said plurality of memory units to be supplied with samples of said second one digital signal at a rate faster than the rate at which said second finite impulse response filter is being clocked.

20. A system according to claim 19 wherein said digital processor includes means for developing a third one of said plurality of binary coded digital signals of said first set containing luminance information, said first, second and third ones of said plurality of binary coded digital signals of said first set each being supplied to said plurality of memory units at the same rate.

21. A system according to claim 20 wherein the aforementioned same rate equals four times the frequency of said color reference signal.

22. A digital signal processing system for a television receiver that develops from a digitally supplied picture information signal an analog signal for displaying said picture or a portion thereof on an image display device, said system comprising:

means for providing binary coded digital samples containing said picture information;

a first processor for operating on said digital samples to develop, at a first rate, a first data stream of first digital signals containing a first portion of said picture information;

a second processor for operating on said digital samples to develop, at a second rate that is faster than said first rate, a second data stream of second digital signals containing another portion of said picture information;

a first interpolator receiving said first digital signals at said first rate for inserting digital signals into said first data stream that are interpolated from said first digital signals to produce a modified first data stream that is developed at said second, faster rate;

means for combining the modified first data stream and the second data stream to produce, at said second rate, an output data stream containing the two portions of said picture information; and a first digital-to-analog converter receiving said output data stream for developing therefrom a first analog signal to display a first image portion on an image display device.

23. A system according to claim 22 wherein the first portion contains color information and the other portion contains luminance information and including a third processor for developing at said first rate a third data stream of third digital signals containing a second color portion of said picture information, a second interpolator receiving said third digital signals at said first rate for inserting digital signals into said third data stream that are interpolated from said third digital signals to produce a modified third data stream that is developed at said second, faster rate, said modified third data stream being combined by said combining means with said modified first data stream and said second data stream to enable said first digital-to-analog converter to develop a first analog signal that results in the display of a first image portion that represents a particular combination of the luminance, first and second color portions of said picture information.

24. A system according to claim 23 wherein said first color portion of said picture information is developed along a first color axis of a color reference signal and wherein said second color portion of said picture information is developed along a second color axis of said color reference signal.

25. A system according to claim 24 wherein said combining means includes first and second means for multiplying said modified first and third data streams by first and second respective ones of a set of coefficient multipliers and includes respective first and second means for summing the products so generated to produce respective fourth and fifth data streams of digital signals containing third and fourth color portions of said picture information that is derived from the information contained in the first and second color portions and that is respectively developed along third and fourth color axes of said color reference signal.

26. A system according to claim 25 wherein said first and second multiplying means each comprises a memory unit arranged as a look-up table multiplier.

27. A system according to claim 25 wherein said first and second color portion of said picture information are respectively developed along the I and Q color axes, wherein said third and fourth color portions are respectively developed along the R−Y and B−Y color axes.

28. A system according to claim 27 wherein said combining means includes third means for multiplying said modified first and third data streams by third ones of said set of coefficient multipliers and third means for summing the products so generated to produce a sixth data stream of digital signals containing a fifth color portion of said picture information that is developed along the G−Y color axis.

29. A system according to claim 28 wherein said combining means includes means for summing said second data stream with each of said fourth, fifth and sixth data streams to respectively produce seventh, eighth and ninth data streams respectively containing red, blue and green color portions of said picture information.

30. A system according to claim 29 wherein said seventh data stream comprises the aforementioned output data stream and wherein the aforementioned first image portion comprises a red image and including second and third digital-to-analog converters respectively receiving said eighth and ninth data streams for respectively developing therefrom second and third analog signals to display on said image device respective second and third image portions respectively comprising blue and green image portions.

31. A system according to claim 24 wherein said first rate is a multiple of the frequency $f_{sc}$, where $f_{sc}$ is the frequency of said color reference signal, and wherein said second rate is a different multiple of the frequency $f_{sc}$.

32. A system according to claim 31 wherein said first rate is $2f_{sc}$ and wherein said second rate is $4f_{sc}$.

33. A system according to claim 31 wherein said first processor includes a chrominance processor responsive to said digital samples for developing chrominance information-containing digital signals at said second rate and a first finite impulse response filter clocked in synchronism with the occurrence of the phase points of said first color axis to produce the unmodified first data stream and wherein said third processor includes a second finite impulse response filter clocked in synchronism with the occurrence of the phase points of said second color axis to produce the unmodified third data stream.

34. A system according to claim 33 wherein said first and second finite impulse response filters are further clocked in synchronism with the occurrence of the phase points that are 180 degrees out-of-phase with the phase points of said first and second color axes, respectively, to develop said first and third unmodified data streams at a first rate of $2f_{sc}$.

35. A system according to claim 22 wherein said first interpolator includes means for developing an interpolated digital signal representing the average value of two successive ones of the unmodified first digital signals and means for alternating said interpolated digital signal with an unmodified one of said first digital signals to produce said modified first data stream.

* * * * *